United States Patent
Hoshi et al.

(10) Patent No.: US 9,188,127 B2
(45) Date of Patent: Nov. 17, 2015

(54) DRIVE UNIT OF MAGNETIC COUPLING PUMP AND MAGNETIC COUPLING PUMP UNIT

(75) Inventors: Hideo Hoshi, Tokyo (JP); Shogo Nakashima, Tokyo (JP); Tatsuya Hidaka, Tokyo (JP); Yasuharu Yamamoto, Kako-gun (JP); Takeshi Okubo, Tokyo (JP); Toshiyuki Osada, Tokyo (JP); Masashi Tagawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/989,456

(22) PCT Filed: Sep. 13, 2012

(86) PCT No.: PCT/JP2012/073468
§ 371 (c)(1),
(2), (4) Date: Oct. 9, 2013

(87) PCT Pub. No.: WO2013/039148
PCT Pub. Date: Mar. 21, 2013

(65) Prior Publication Data
US 2014/0023535 A1    Jan. 23, 2014

(30) Foreign Application Priority Data
Sep. 15, 2011   (JP) ................................. 2011-201851

(51) Int. Cl.
*F04D 13/02* (2006.01)
*F04D 13/06* (2006.01)
(Continued)

(52) U.S. Cl.
CPC ............ *F04D 13/026* (2013.01); *F04D 13/024* (2013.01); *F04D 13/025* (2013.01);
(Continued)

(58) Field of Classification Search
CPC ... F04D 13/024; F04D 13/06; F04D 13/0606; F04D 29/406; F04D 29/42; F04D 29/426; F04D 29/4266; F04D 29/62; F04D 29/628; F04D 13/025; F04D 13/026; F04D 13/062; F04D 29/0476
USPC ............ 417/420, 423.1, 423.7, 423.8, 423.14
See application file for complete search history.

(56) References Cited

U.S. PATENT DOCUMENTS 2,763,214 A * 9/1956 White ........................... 417/357
2,970,548 A * 2/1961 Berner .......................... 417/420
(Continued)

FOREIGN PATENT DOCUMENTS

| CN | 201523283 | 7/2010 |
| --- | --- | --- |
| CN | 101900129 | 12/2010 |

(Continued)

OTHER PUBLICATIONS

Chinese Notification of the First Office Action issued Sep. 4, 2013 in corresponding Chinese Patent Application No. 201280003446.9 with English translation.
(Continued)

*Primary Examiner* — Peter J Bertheaud
(74) *Attorney, Agent, or Firm* — Wenderoth, Lind & Ponack, L.L.P.

(57) ABSTRACT

A drive unit of a magnet coupling pump, in which leakage of the magnetic flux to the outside and the effect of the external magnetic field are suppressed. The drive unit includes: a driving magnet (219) positioned at an outside of the driven magnet (19) of the magnetic coupling pump (100) with respect to a rotation axis (A) of the magnetic coupling pump (100) to face the driven magnet (19) with a gap; a cup tube portion (221) made of a ferromagnetic material and in a tubular shape centered on the rotation axis (A); a case main body (231) including a cup (220) in which the driving magnet is fixed inside of the cup tube portion; a motor (210) rotating the cup around the rotation axis, and a tube portion (232), which is tubular in shape. The cup is provided in the tube portion (232) with a gap.

7 Claims, 6 Drawing Sheets

(51) Int. Cl.
| | |
|---|---|
| *F04D 29/62* | (2006.01) |
| *H02K 49/10* | (2006.01) |
| *F04D 29/047* | (2006.01) |
| *F04D 29/048* | (2006.01) |
| *H02K 7/11* | (2006.01) |
| *H02K 7/14* | (2006.01) |

(52) U.S. Cl.
CPC ............ *F04D29/047* (2013.01); *F04D 29/048* (2013.01); *F04D 29/628* (2013.01); *H02K 49/106* (2013.01); *F04D 13/0626* (2013.01); *H02K 7/11* (2013.01); *H02K 7/14* (2013.01)

(56) References Cited

U.S. PATENT DOCUMENTS

| | | | | |
|---|---|---|---|---|
| 3,465,681 | A * | 9/1969 | Zimmermann | 417/420 |
| 3,932,068 | A * | 1/1976 | Zimmermann | 417/420 |
| 4,226,574 | A * | 10/1980 | Villette | 417/420 |
| 4,304,532 | A * | 12/1981 | McCoy | 417/420 |
| 4,613,289 | A * | 9/1986 | Kotera | 417/420 |
| 5,017,102 | A | 5/1991 | Shimaguchi et al. | |
| 5,154,587 | A * | 10/1992 | Mori et al. | 417/420 |
| 5,269,664 | A * | 12/1993 | Buse | 417/360 |
| 5,464,333 | A * | 11/1995 | Okada et al. | 417/420 |
| 5,915,931 | A * | 6/1999 | Lindner et al. | 417/420 |
| 7,057,320 | B2 * | 6/2006 | Abordi et al. | 310/103 |
| 7,500,829 | B2 * | 3/2009 | Edwards et al. | 416/170 R |
| 2002/0054820 | A1 * | 5/2002 | Fukamachi et al. | 417/420 |
| 2007/0177995 | A1 * | 8/2007 | Yano | 417/365 |
| 2008/0075586 | A1 | 3/2008 | Fukuki et al. | |

FOREIGN PATENT DOCUMENTS

| | | |
|---|---|---|
| JP | 01-103134 | 4/1989 |
| JP | 07-021080 | 5/1995 |
| JP | 7-136247 | 5/1995 |
| JP | 2002-39086 | 2/2002 |
| JP | 2003-322242 | 11/2003 |
| JP | 2005-94830 | 4/2005 |
| JP | 2005-127222 | 5/2005 |
| JP | 2005-160274 | 6/2005 |
| JP | 4108054 | 6/2008 |
| JP | 2009-197736 | 9/2009 |
| WO | 81/01727 | 6/1981 |

OTHER PUBLICATIONS

International Search Report issued Dec. 11, 2012 in corresponding International (PCT) Application No. PCT/JP2012/073468 with English Translation.
Written Opinion of the International Searching Authority issued Dec. 11, 2012 in International (PCT) Application No. PCT/JP2012/073468 with English Translation.
Chinese Office Action dated Feb. 24, 2014 issued in corresponding Chinese Application No. 201280003446.9 (with English Translation).
Extended European Search Report issued Jan. 28, 2015 in corresponding European patent application No. 12832611.3.

* cited by examiner

DRIVE UNIT OF MAGNETIC COUPLING PUMP AND MAGNETIC COUPLING PUMP UNIT

BACKGROUND OF THE INVENTION

1. Technical Field

The present invention relates to a drive unit of a magnetic coupling pump in which an impeller provided with a permanent magnet as a driven magnet is rotated by rotating a permanent magnet which is a driving magnet. Also, the present invention relates to a magnetic coupling pump unit provided with the drive unit.

Priority is claimed based on Japanese Patent Application No. 2011-201851, filed Sep. 15, 2011, the content of which is incorporated herein by reference.

2. Description of the Related Art

As a magnetic coupling pump unit, for example, there is one disclosed in Japanese Patent (Granted) Publication No. 4108054.

The pump of the magnetic coupling pump unit disclosed in JP Publication No. 4108054 includes an impeller and a fixing body. A hydrodynamic pressure bearing part, which rotatably supports the impeller around the rotation axis, is formed to the fixing body. A driven magnet made of a permanent magnet is provided to the impeller. In addition, the drive unit rotating the impeller of the pump includes a rotating magnetic field generating device, which generates a rotating magnetic field around the rotation axis magnetically coupled to the driven magnet of the pump.

SUMMARY OF THE INVENTION

1. Technical Problem

External electronics or the like can be adversely affected in the drive unit disclosed in JP Publication No. 4108054 by the leakage of magnetic flux to the outside, since the pump is driven by rotating the driving magnet magnetically couple to the driven magnet provided to the pump side. Also, the stable rotation of the impeller can be disturbed by imbalance of the magnetic coupling between the driving and driven magnets in the presence of a magnetic body outside.

The inventors of the present invention focus attention on the problems mentioned above. The purpose of the present invention is to provide a drive unit of a magnetic coupling pump suppressing the leakage of magnetic flux to the outside and the effect of the external magnetic field, and a magnetic coupling pump unit provided with the drive unit.

2. Solution to the Problem

A drive unit of a magnetic coupling pump related to the present invention for solving the above problems is a drive unit of a magnetic coupling pump with an impeller, which is rotatable around a rotation axis, and a driven magnet, which is made of a permanent magnet and fixed to the impeller. The drive unit includes: a mount part to which the magnetic coupling pump is attached; a driving magnet positioned at an outside of the driven magnet of the magnetic coupling pump with respect to a rotation axis of the magnetic coupling pump attached to the mount part so as to face the driven magnet with a gap; and a magnet retaining ring, which is made of a ferromagnetic material and includes a tube portion having a tubular shape centered on the rotation axis of the magnetic coupling pump attached to the mount part, the driving magnet being fixed to an inside of the tube portion; a motor rotating the magnet retaining ring around the rotation axis of the magnetic coupling pump attached to the mount part; and a magnetism shielding body including a tube portion, which is made of a paramagnetic material and is in a tubular shape. The magnetic retaining ring is provided to an inside of the tube portion of the magnetism shielding body with a gap.

The magnetic flux directed to the outside and to the circumferential direction among the magnetic flux formed by the driven and driving magnets pass through the magnet retaining ring making the magnet retaining ring be a part of the magnetic circuit, since the driving magnet is fixed to the inside of the magnet retaining ring made of a ferromagnetic material in the drive unit. Because of this, the amount of leakage of the magnetic flux formed by the driven and driving magnets to the outside can be reduced to an extremely low level in the drive unit. Further, passing the magnetic flux through the magnetism shielding body from the inside to the outside can be suppressed, since the magnetism shielding body, which is made of a paramagnetic material, is provided to the outside of the magnet retaining ring with the interspace.

Therefore, the leakage of magnetic flux to the outside of the magnetism shielding body can be suppressed in the minimum level in the drive unit.

Also, passing through the magnetic flux from the external magnetic body to the inside of the magnetism shielding body made of the paramagnetic material can be suppressed even in the presence of the magnetic body outside of the magnetism shielding body in the drive unit. Further, the leakage of magnetic flux from the outside to the inside of the magnetic retaining ring can be suppressed, since the magnet retaining ring made of the ferromagnetic material is provided inside of the magnetism shielding body in the drive unit.

As explained above, the first magnetic shielding measure, in which the leakage of the magnetic flux from a part is suppressed by actively allowing the magnetic flux to pass through the part (the magnet retaining ring made of the ferromagnetic material), and the second magnetic shielding measure, in which the passage of the leaked the magnetic flux through the parts (the magnetism shielding body made of paramagnetic material) is suppressed, are combined in the drive unit. Therefore, the leakage of the magnetic flux to the outside and the effect of the external magnetic field can be suppressed effectively. Specifically, the leakage of the magnetic flux from the part (the magnet retaining ring made of ferromagnetic material) to the outside is suppressed by the first shielding measure, and then, the passing through the magnetic flux to the outside is further suppressed by the second shielding measure in the drive unit. Therefore, the leakage of the magnetic flux to the outside can be suppressed very effectively.

The drive unit of a magnetic coupling pump described above may further include a drive unit casing housing the magnet retaining ring and the motor, wherein the drive unit casing comprises the mount part and the magnetism shielding body.

The leakage of the magnetic flux to the outside of the casing of the drive unit and the effect of the magnetic field outside of the casing of the drive unit can be suppressed in the drive unit.

In the drive unit of a magnetic coupling pump described above, the driving magnet may be made of a neodymium magnet.

The driving magnet can be down-sized and light-weighted since the neodymium magnet with an extremely strong magnetic force is used in the drive unit. Therefore, the drive unit can be down-sized and light-weighted, and the inertia force of the rotating body can be reduced.

In the drive unit of a magnetic coupling pump described above, a convex shape cooling fin may be formed on an outer circumferential surface of the tube portion of the magnetism shielding body along an outside of the tube portion.

Temperature increase of the magnetism shielding body and the inside of the magnetism shielding body can be suppressed in the above-mentioned drive unit. Therefore, reduction of magnetic force due to the temperature increase can be suppressed, for example in a case where the neodymium magnet, which has a relatively high magnet force but its magnetic force is substantially reduced due to the temperature increase, is used as the driving magnet.

In the drive unit of a magnetic coupling pump described above, the tube portion of the magnetism shielding body may be made of a paramagnetic aluminum alloy.

The drive unit can be light-weight since at least the tube portion of the magnetism shielding body is made of the aluminum alloy with a relatively low density in the drive unit. Further, radiation effect can be improved since at least the tube portion of the magnetism shielding body is made of the aluminum alloy with a relatively high heat conductivity.

A magnetic coupling pump unit related to the present invention for solving the above problems is a magnetic coupling pump unit including the drive unit of a magnetic coupling pump mentioned above, and the magnetic coupling pump. The magnetic coupling pump includes a pump casing which houses the impeller allowing the impeller to be rotated in the pump casing, and the driving magnet is provided to an outside of the pump casing centered on a rotation axis of the magnetic coupling pump attached to the mount part with a gap.

Another magnetic coupling pump unit related to the present invention for solving the above problems is a magnetic coupling pump unit including: an impeller, which is rotatable around a rotation axis; a driven magnet, which is made of a permanent magnet and fixed to the impeller; a driving magnet made of permanent magnet and positioned at an outside of the driven magnet with respect to the rotation axis with a gap; a magnet retaining ring, which is made of a ferromagnetic material and includes a tube portion having a tubular shape centered on the rotation axis, the driving magnet being fixed to an inside of the tube portion; a motor rotating the magnet retaining ring around the rotation axis; and a magnetism shielding body including a tube portion, which is made of a paramagnetic material and is in a tubular shape centered on the rotation axis, the magnetic retaining ring being provided to an inside of the tube portion of the magnetism shielding body with a gap.

The leakage of the magnetic flux to the outside and the effect of the external magnetic field can also be suppressed in these magnetic coupling pump units, since they have the magnet retaining ring and the magnetism shielding body as the above-described drive unit.

In the magnetic coupling pump units described above, the impeller may include a tube portion, an outer circumferential surface of which is in a tubular shape centered on the rotation axis, and the pump casing may include a hydrodynamic bearing forming portion, which houses the tube portion of the impeller and supports the tube portion rotatably without contacting the tube portion, an inner circumferential surface of the hydrodynamic bearing forming portion being in a tubular shape.

The impeller can be rotatably supported without contacting the pump casing in the magnetic coupling pump units described above.

3. Advantageous Effects of the Invention

The leakage of the magnetic flux to the outside and the effect of the external magnetic field can be suppressed in the present invention.

DETAILED DESCRIPTION OF THE INVENTION

Figure 1:
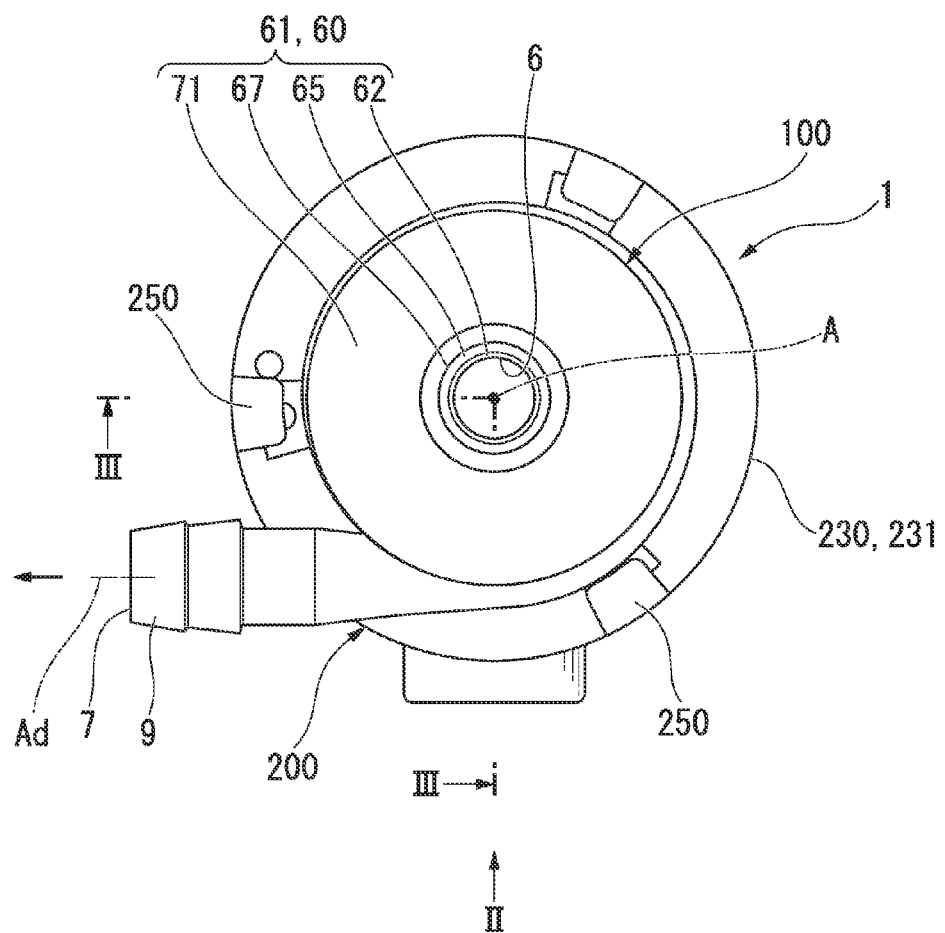
FIG. 1 is a plan view of a magnetic coupling pump unit constructed in accordance with an embodiment related to the invention.

Hereinafter, an embodiment of a magnetic coupling pump unit related to the present invention will be described in detail referring to the drawings.

Figure 2:
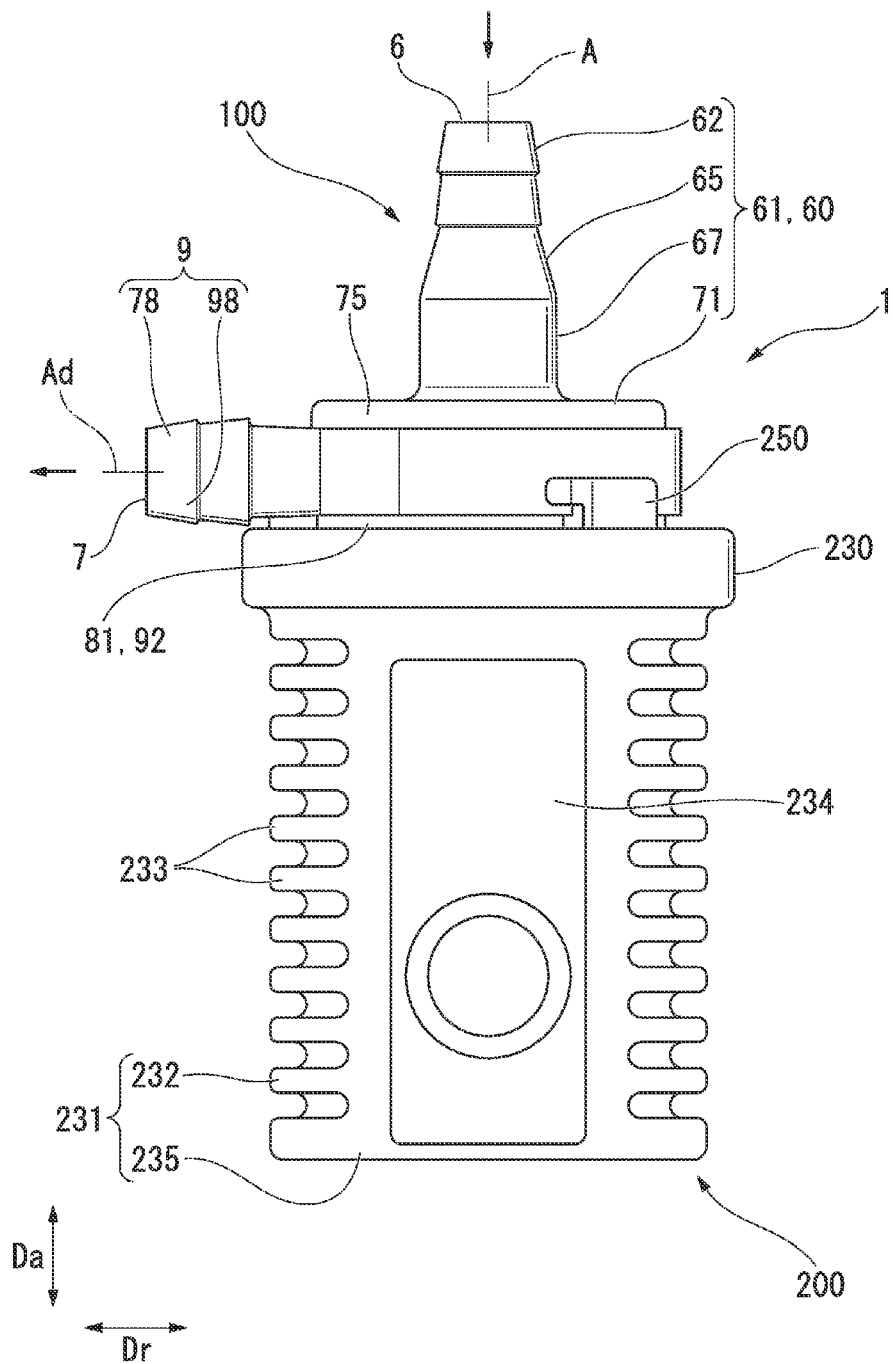
FIG. 2 is a view as seen from arrow II in FIG. 1.
Figure 3:
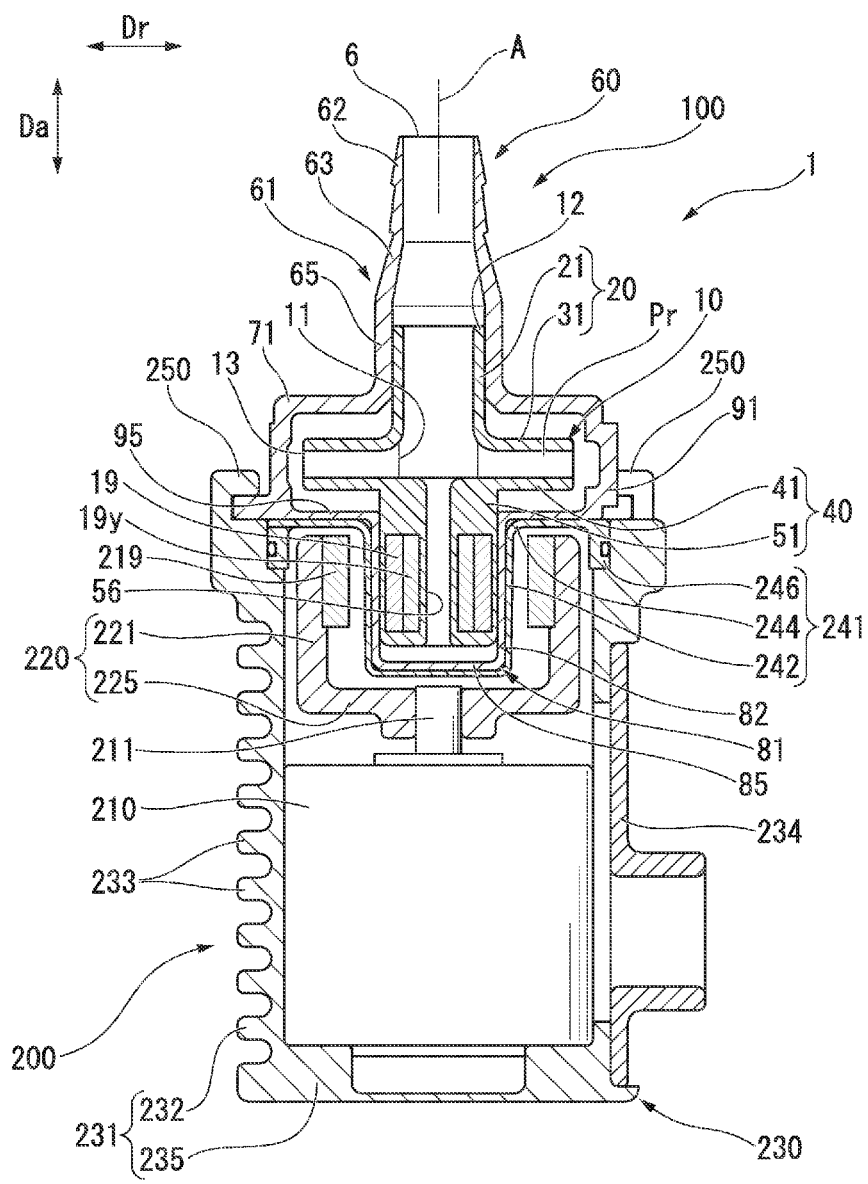
FIG. 3 is a cross-sectional view taken along line III-III in FIG. 1.

The magnetic coupling pump unit 1 of the present embodiment includes a magnetic coupling pump 100 and a drive unit 200 that drives the magnetic coupling pump 100 as shown in FIGS. 1 to 3.

Figure 4:
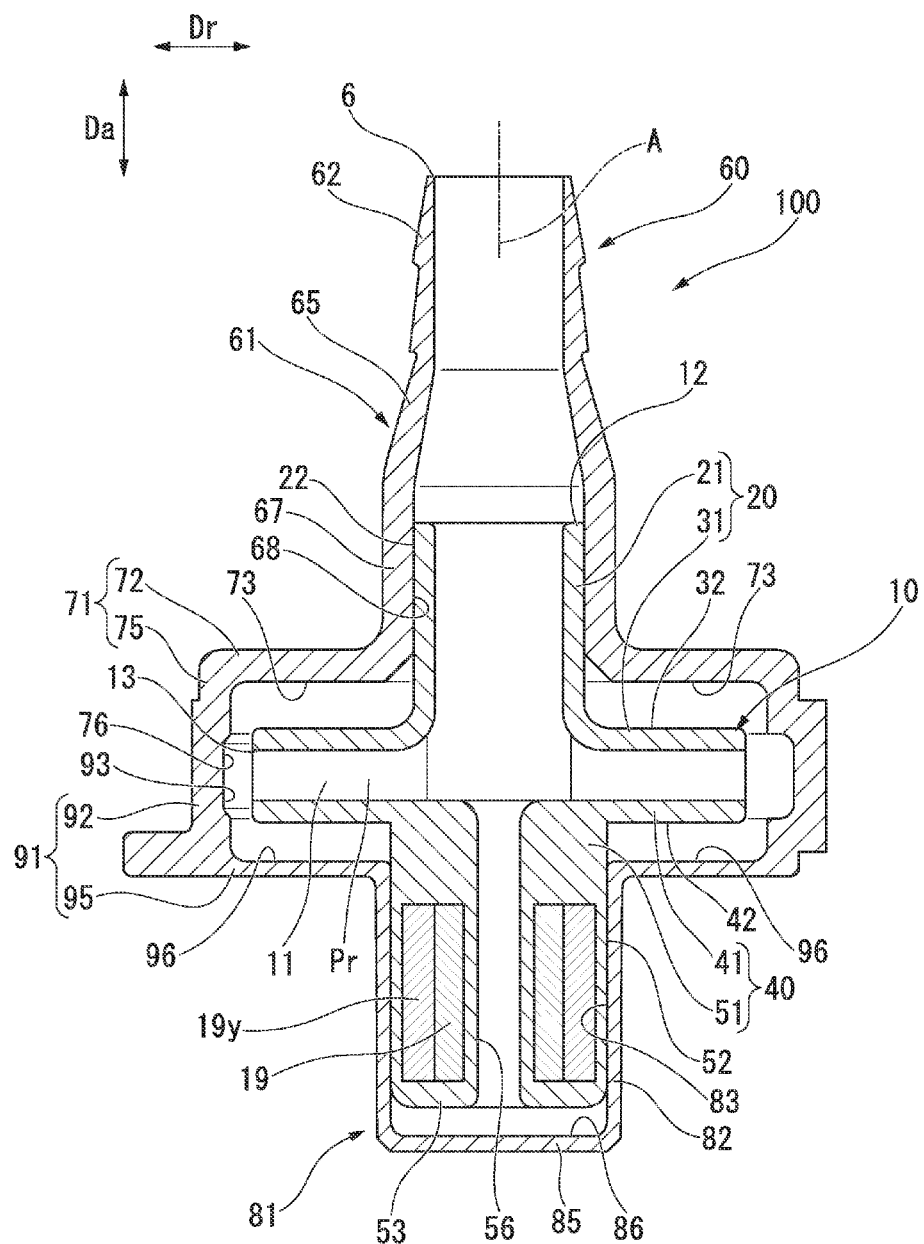
FIG. 4 is a cross-sectional view of a magnetic coupling pump in the embodiment related to the invention.

The magnetic coupling pump 100 includes the closed impeller 10 and the pump casing 60 that houses the impeller 10 in such a way that the impeller is rotatable around a rotation axis A as shown in FIG. 4.

The pump casing 60 is formed with a discharge port (refer to FIGS. 1 and 2) 7 for discharging a liquid, and a suction port 6 for suctioning a liquid on an extension line of the rotation axis A. In addition, in the following, in an axial direction Da in which the rotation axis A extends, a suction port 6 side of the pump casing 60 is defined as a front side and a side opposite to the front side is defined as a rear side. Additionally, in a radial direction Dr that is a direction perpendicular to the rotation axis A, a side approaching the rotation axis A is defined as an inward side and a side moving away from the rotation axis A is defined as an outward side.

The impeller 10 has a plurality of blades 11 provided around the rotation axis A, a front shroud 20 that covers the front side of the plurality of blades 11, and a rear shroud 40 that covers the rear side of the plurality of blades 11. As described above, the impeller 10 forms a closed impeller as the front and rear of the plurality of blades 11 are covered with the front shroud 20 and the rear shroud 40. The plurality of blades 11, the front shroud 20, and the rear shroud 40 are joined to each other.

The front shroud 20 forms a cylindrical shape around the rotation axis A, and has an inlet tube portion 21 that forms an impeller inlet 12 in which a front opening in the axis direction Da faces the suction port 6 of the pump casing 60, and a front plate portion 31 that is provided at a rear end in the inlet tube portion 21 and covers the front side of the plurality of blades 11. Additionally, the rear shroud 40 has a rear plate portion 41 that covers the rear side of the plurality of blades 11, and a shaft portion 51 that is provided at a rear end of the rear plate portion 41 and is columnar around the rotation axis A.

Both the shapes of the front plate portion 31 of the front shroud 20 and the rear plate portion 41 of the rear shroud 40 as viewed from the axis direction Da are circular around the rotation axis A. The front plate portion 31 and the rear plate portion 41 are apart from each other in the axis direction Da, and the plurality of blades 11 are fixed between the front plate portion 31 and the rear plate portion 41. An outer edge in the radial direction Dr between the front plate portion 31 and the rear plate portion 41 forms an impeller outlet 13. An intra-impeller flow channel Pr is formed between the plurality of blades 11 between the front plate portion 31 and the rear plate portion 41 within the inlet tube portion 21.

The shaft portion 51 of the rear shroud 40 is formed with a through hole 56 that passes through a rotation axis A in the axis direction Da and allows the intra-impeller flow channel Pr to communicate between a rear end face 53 of the shaft portion 51 and the pump casings 60. A driven yoke 19y, which is formed of a ferromagnetic material and in a tubular shape, and a plurality of driven magnets 19 formed of permanent magnets are embedded at a position between an outer peripheral surface 52 of the shaft portion and an inner peripheral surface of the through hole 56 in the shaft portion 51. The driven magnets 19 are provided to the outer circumference of the driven yoke 19y in the tubular shape.

The pump casing 60 has a pump front casing 61 that covers the front shroud 20 of the impeller 10, and a pump rear casing 81 that covers the rear shroud 40 of the impeller 10.

The pump front casing 61 has a substantially cylindrical suction hose connecting pipe portion 62 to which a suction hose is connected, an enlarged-diameter pipe portion 65 of which the internal diameter is gradually enlarged from a rear end of the suction hose connecting pipe portion 62 toward the rear side, a front bearing forming portion 67 that is provided at a rear end of the enlarged-diameter pipe portion 65 and is formed with an inner peripheral surface 68 that faces the outer peripheral surface 22 of the inlet tube portion 21 of the front shroud 20 at a distance therefrom, and a front casing body portion 71 that is provided at a rear end of the front bearing forming portion 67 and covers the front plate portion 31 of the front shroud 20.

A front end of the suction hose connecting pipe portion 62 terminates in an opening, and this opening forms the suction port 6 of the pump casing 60.

The front casing body portion 71 has a flat-plate-ring-shaped front face facing portion 72 that widens from a rear end of the front bearing forming portion 67 to the rear end, and faces the front face 32 of the front plate portion 31 of the front shroud 20 at a distance therefrom in the axis direction Da, and a front body tube portion 75 that forms a substantially cylindrical shape around the rotation axis A and extends from the outer peripheral edge of the front face facing portion 72 to the rear side. The shape in the cross-section of the inner peripheral surface 76 of the front body tube portion 75 perpendicular to the rotation axis A forms a volute shape. The inner peripheral surface 76 of the front body tube portion 75 faces the outer peripheral edge of the front plate portion 31 of the front shroud 20 at a distance therefrom.

The pump rear casing 81 has a rear casing body portion 91 that is provided at a rear end of the front casing body portion 71 and covers the rear plate portion 41 of the rear shroud 40, a rear bearing forming portion 82 that is formed with an inner peripheral surface 83 that is provided at a rear casing body portion 91 and faces the outer peripheral surface 52 of the shaft portion 51 of the rear shroud 40 at a distance therefrom, and a flat-plate circular rear wall plate portion 85 that is provided at a rear end of the rear bearing forming portion 82 and faces the shaft portion 51 of the rear shroud 40 at a distance therefrom in the axis direction Da.

The rear casing body portion 91 has a rear body tube portion 92 that forms a substantially cylindrical shape around the rotation axis A and extends from a rear end of the front casing body portion 71 to the rear side, and a flat-plate-ring-shaped rear face facing portion 95 that widens from a rear end of the rear body tube portion 92 to the inward side and faces the rear face 42 of the rear plate portion 41 of the rear shroud 40 at a distance therefrom in the axis direction Da. An inner edge of the rear face facing portion 95 is provided with a rear bearing forming portion 82 that extends rearward from this inner edge.

The pump casing 60, as shown in FIGS. 1 and 2, has a substantially cylindrical discharge hose connecting pipe portion 9 to which a discharge hose is connected. An axis Ad of the substantially cylindrical discharge hose connecting pipe portion 9 is parallel to a face perpendicular to the rotation axis A. Additionally, the discharge hose connecting pipe portion 9 is divided into two in a front-and-rear direction in a plane passing through the axis Ad. One discharge hose connecting pipe hose portion is provided at the front body tube portion 75 of the pump front casing 61 as a connecting pipe front divided portion 78, and the other discharge hose connecting pipe hose portion is provided at the rear body tube portion 92 of the pump rear casing 81 as a connecting pipe rear divided portion 98. An outer end of the discharge hose connecting pipe portion 9 opens, and this opening forms the discharge port 7 of the pump casing 60.

The pump front casing 61 and the pump rear casing 81 are integrally molded products made of resin, respectively. The pump front casing 61 and the pump rear casing 81 are joined together with an adhesive.

Figure 5:
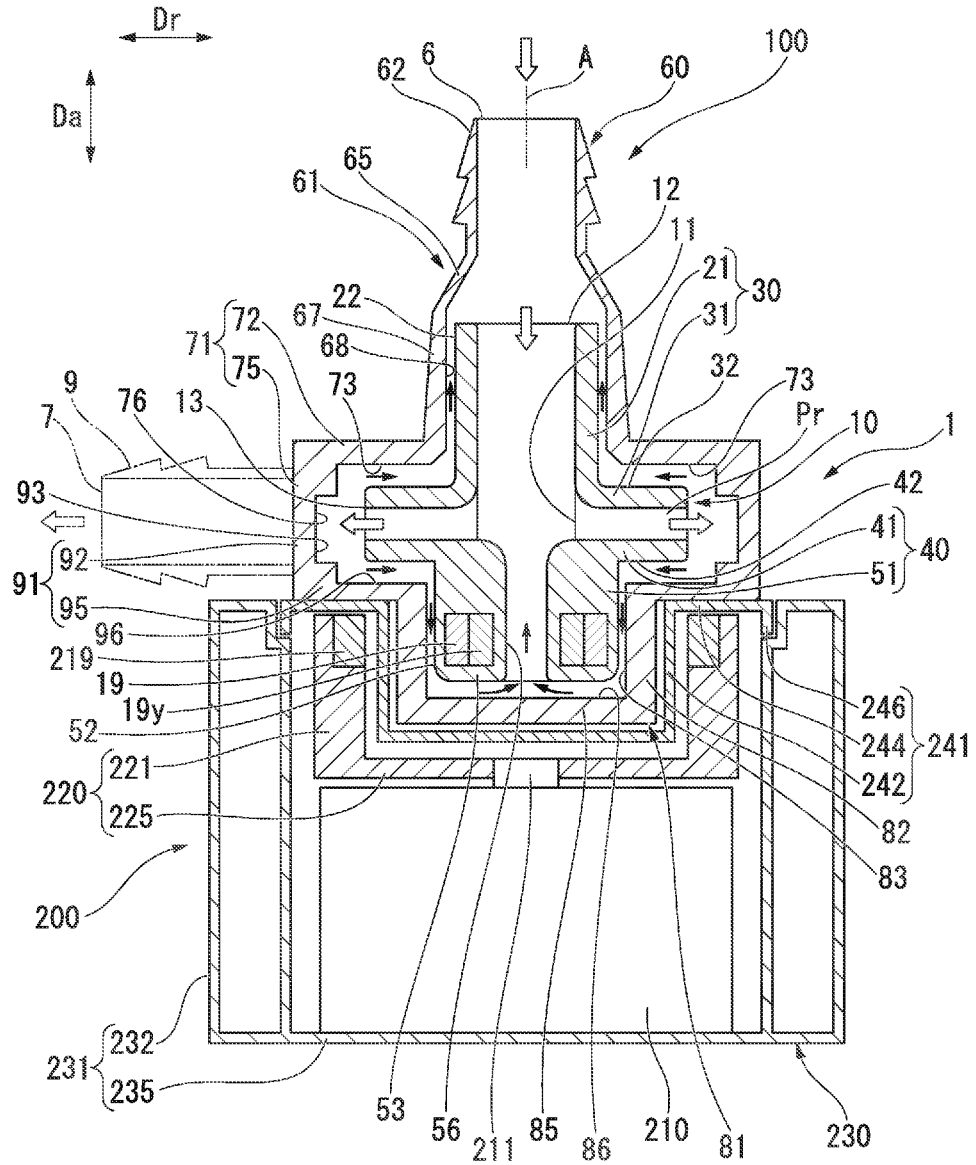
FIG. 5 is a schematic view schematically depicting the cross-section of the magnetic coupling pump unit in the embodiment related to the invention.

The pump drive unit 200, as shown in FIGS. 3 and 5, is equipped with a motor 210 having a rotating output shaft 211, a cup (the magnet retaining ring) 220 that forms a bottomed cylindrical shape, a plurality of driving magnets 219 that are fixed to the inner peripheral side of the cup 220, a drive unit casing 230 that covers the motor 210 and the cup 220, and a lock member 250 for maintaining mounting of the magnetic coupling pump 100 mounted on the drive unit casing 230.

The cup 220 is formed from, for example, carbon steel, such as SS400, which is a ferromagnetic material, and serves as a yoke of the plurality of driving magnets 219. The cup 220 has a cylindrical cup cylinder portion 221, and a flat-plate circular motor connection 225 that blocks one opening of the cup cylinder portion 221. The output shaft 211 of the motor 210 is fixed onto an extension line of the axis of the cup cylinder portion 221 on the motor connection 225. As mentioned above, the plurality of driving magnets 219 are fixed to the inner peripheral side of the cup cylinder portion 221. The driving magnets 219 are permanent magnets, for example, Nd (neodymium) magnets.

The internal diameter of the cup cylinder portion 221 is larger than the external diameter of the rear bearing forming portion 82 of the pump rear casing 81. Additionally, a length (hereinafter referred to as magnet array diameter) twice the radial length from the axis of the cup cylinder portion 221 to the inner surface of each driving magnet 219 is larger than the external diameter of the rear bearing forming portion 82 of the pump rear casing 81.

The drive unit casing 230 has a bottomed cylindrical casing body (the magnetism shielding body) 231, and a cap 241 that blocks an opening of the casing body 231.

The casing body 231 is formed from, for example, an Al (aluminum) alloy that is a paramagnetic material. The casing body 231 has a cylindrical casing cylinder portion 232 that has a larger internal diameter than the external diameter of the cup 220 and the external diameter of the motor 210, and a flat-plate circular casing bottom portion 235 that blocks one opening of the casing cylinder portion 232.

The motor 210 is put into the casing body 231, and is fixed to the casing bottom portion 235 with screws or the like. A portion of an outer periphery of the casing cylinder portion 232 forms a concavo-convex shape in the radial direction Dr, and convex portions form radiation fins 233. Additionally, a power cable plate 234 for allowing a power cable of the motor 210 to pass therethrough is constructed in another portion of the casing cylinder portions 232.

The cap 241 is formed from, for example, resin, such as engineering plastic. The cap 241 has a pump fitting portion 242 that forms a bottomed cylindrical shape and into which the rear bearing forming portion 82 and the rear wall plate portion 85 of the pump rear casing 81 fit, a pump receiving portion 244 that widens from an opening edge of the bottomed cylindrical pump fitting portion 242 to the outward side and forms a flat-plate ring shape, and an engaging portion 246 that is formed at an outer peripheral edge of the pump receiving portion 244 and engages an opening edge of the casing body 231. The cap 241 constitutes the mount part, to which the magnetic coupling pump 100 is attached.

The internal diameter of the bottomed cylindrical pump fitting portion 242 is substantially equal to the external diameter of the rear bearing forming portion 82 of the pump casing 60. Hence, the rear bearing forming portion 82 of the pump casing 60 can be fitted into the pump fitting portion 242 of the cap 241. Additionally, the pump fitting portion 242 has a smaller external diameter than the internal diameter of the cup cylinder portion 221 and the aforementioned magnet array diameter, and enters the cylindrical bottomed cup 220 in a non-contact state with the driving magnets 219 fixed to the cup 220.

Next, the operation of the magnetic coupling pump unit described above and the action of the magnetic coupling pump unit described above based on the operation will be described.

When the magnetic coupling pump unit 10 is driven, first, the suction hose is connected to the suction hose connecting pipe portion 62 of the magnetic coupling pump 100, and the discharge hose is connected to the discharge hose connecting pipe portion 9 by the operator.

Next, the rear bearing forming portion 82 of the pump casing 60 is fitted into the pump fitting portion 242 of the cap 241 of the drive unit casing 230, and the magnetic coupling pump 100 is attached to the pump drive unit 200. In this case, the rear face facing portion 95 of the pump casing 60 and the pump receiving portion 244 of the cap 241 come into contact with each other. Next, the pump casing 60 is fixed to the drive unit casing 230 by the lock member 250.

In the magnetic coupling pump unit, in this state, the driven magnets 19 embedded in the shaft portion 51 of the magnetic coupling pump 100 and the driving magnets 219 fixed to the cup 220 of the pump drive unit 200 face each other in the radial direction Dr, and both the magnets are magnetically coupled to each other. Additionally, the output shaft 211 of the motor 210 is located on the extension line of the rotation axis A of the dynamic pressure bearing pump 100.

In addition, in the above, the magnetic coupling pump 100 is attached to the drive unit 200 after the connection of the suction hose and the discharge hose, the connection of the suction hose and the discharge hose may be performed after the attachment of the magnetic coupling pump 100.

Next, electric power is supplied to the motor 210 of the drive unit 200 so as to rotate the output shaft 211 of the motor 210 and rotate the cup 220 fixed to the output shaft 211 and the plurality of driving magnets 219 fixed to the cup 220. If the driving magnets 219 of the drive unit 200 rotate, the driven magnets 19 of the magnetic coupling pump 100 that are magnetically coupled to the driving magnets 219 also rotates around the rotation axis A with the rotation of the driving magnets 219. The driven magnets 19 of the magnetic coupling pump 100 are embedded in the shaft portion 51 of the impeller 10. For this reason, if the driving magnets 219 of the drive unit 200 rotate, the impeller 10 rotates around the rotation axis A within the pump casing 60 together with the driven magnets 19.

As described above, in the present embodiment, the shaft portion 51 of the impeller 10 is arranged inside the plurality of driving magnets 219 and the driven magnets 19 are embedded within the shaft portion 51. Thus, the external diameter of the shaft portion 51 of the impeller 10 can be made smaller than that in a case where the driven magnets are arranged outside the driving magnets. Hence, according to the present embodiment, it is possible to reduce the size and weight of the impeller 10, and an inertia force regarding the rotation of the impeller 10 can be made small.

If the impeller 10 begins to rotate within the pump casing 60, as shown in FIG. 5, a liquid is suctioned into the pump casing 60 from the suction port 6 of the pump casing 60. The liquid suctioned into the pump casing 60 enters the intra-impeller flow channel Pr within the impeller 10 from the impeller inlet 12.

After the liquid that has entered the intra-impeller flow channel Pr receives a centrifugal force from the plurality of rotating blades 11 and flows out of the impeller outlet 13, the liquid is discharged from the discharge port 7 of the pump casing 60.

A portion of the liquid that has flowed out of the impeller outlet 13, returns into the enlarged-diameter pipe portion 65 of the pump front casing 61 through between the inner peripheral surface 68 of the front bearing forming portion 67 of the pump front casing 61 and the outer peripheral surfaces 22 of the inlet tube portion 21 of the front shroud 20 from between the inner surface 73 of the front face facing portion 72 of the pump front casing 61 and the front face 32 of the front plate portion 31 of the front shroud 20. Then, the liquid enters the intra-impeller flow channel Pr again from the impeller inlet 12.

Figure 6:
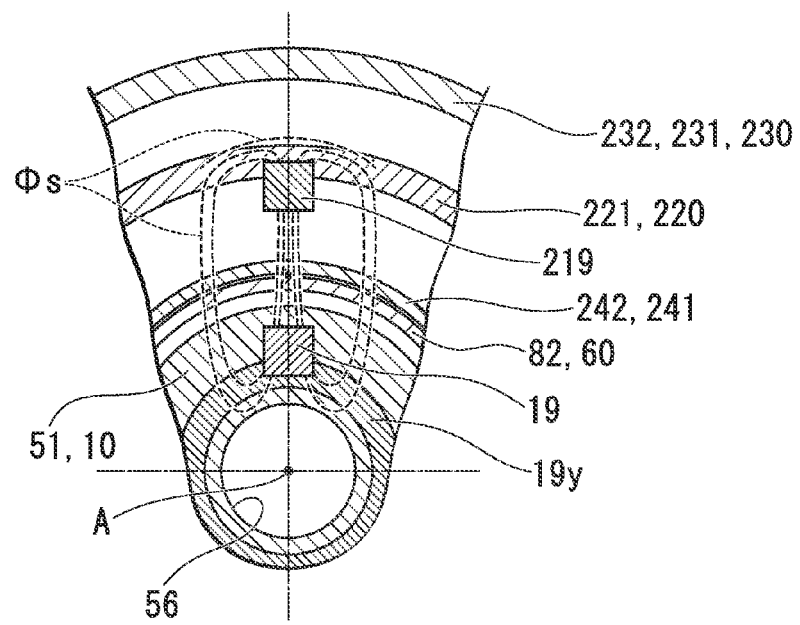
FIG. 6 is a schematic view schematically depicting the cross-section of a substantial part of the magnetic coupling pump unit in the embodiment related to the invention.

Additionally, the other portion of the liquid that has flowed out of the impeller outlet 13, as shown in FIGS. 6 and 8, returns to the intra-impeller flow channel Pr through between the inner peripheral surface 83 of the rear bearing forming portion 82 of the pump rear casing 81 and the outer peripheral surface 52 of the shaft portion 51 of the rear shroud 40, through between the inner surface 86 of the rear wall plate portion 85 of the pump rear casing 81 and the rear end face 53 of the shaft portion 51 of the rear shroud 40, and through the through hole 56 of the rear shroud 40, from between the inner surface 96 of the rear face facing portion 95 of the pump rear casing 81 and the rear face 42 of the rear plate portion 41 of the rear shroud 40.

A generatrix of the inner peripheral surface 68 of the front bearing forming portion 67 of the pump front casing 61 and a generatrix of the outer peripheral surface 22 of the inlet tube portion 21 of the front shroud 20 are parallel to each other. In other words, the distance between the inner peripheral surface 68 of the front bearing forming portion 67 and the outer peripheral surface 22 of the inlet tube portion 21 is constant in the axis direction Da. Additionally, both the cross-sectional shapes of the inner peripheral surface 68 of the front bearing forming portion 67 of the pump front casing 61 and the outer peripheral surface 22 of the inlet tube portion 21 of the front shroud 20 perpendicular to the rotation axis A are circles. For this reason, the inner peripheral surface 68 of the front bearing forming portion 67 and the outer peripheral surface 22 of the inlet tube portion 21 form dynamic pressure radial bearing faces, respectively, and the liquid that flows between both the faces 68 and 22 functions as a lubrication fluid. Hence, as for the impeller 10, the portion of the inlet tube portion 21 of the impeller 10 is rotatably supported in a non-contact state in the radial direction Dr by the pump casing 60. In addition, when the rotational frequency of the impeller 10 is low, such as at the start of rotation of the impeller 10, a portion of the inner peripheral surface 68 of the front bearing forming portion 67 and a portion of the outer peripheral surface 22 of the inlet tube portion 21 come into contact with each other. If the rotational frequency of the impeller 10 becomes equal to or more than a predetermined rotational frequency, the inlet tube portion 21 floats with respect to the inner peripheral surface 68 due to the dynamic pressure of a fluid that works between both the faces 68 and 22, and as mentioned above, the inlet tube portion 21 of the impeller 10 is rotatably supported in a non-contact state by the inner peripheral surface 68.

Additionally, a generatrix of the inner peripheral surface 83 of the rear bearing forming portion 82 of the pump rear casing 81 and a generatrix of the outer peripheral surface 52 of the shaft portion 51 of the rear shroud 40 are parallel to each other. In other words, the distance between the inner peripheral surface 83 of the rear bearing forming portion 82 and the outer peripheral surface 52 of the shaft portion 51 is constant in the axis direction Da. Additionally, both the cross-sectional shapes of the inner peripheral surface 83 of the rear bearing forming portion 82 of the pump rear casing 81 and the outer peripheral surface 52 of the shaft portion 51 of the rear shroud 40 perpendicular to the rotation axis A are circles. For this reason, the inner peripheral surface 83 of the rear bearing forming portion 82 and the outer peripheral surface 52 of the shaft portion 51 form dynamic pressure radial bearing faces, respectively, and the liquid that flows between the inner peripheral surface 83 and the outer peripheral surface 52 functions as a lubrication fluid. Hence, as for the impeller 10, the portion of the shaft portion 51 of the impeller 10 is rotatably supported in a non-contact state in the radial direction Dr by the pump casing 60. In addition, as for the shaft portion 51 of the impeller 10, similarly to the inlet tube portion 21, a portion of the inner peripheral surface 83 of the rear bearing forming portion 82 and a portion of the outer peripheral surface 52 of the shaft portion 51 come into contact with each other when the rotational frequency of the impeller 10 is low. If the rotational frequency of the impeller 10 becomes equal to or more than a predetermined rotational frequency, the shaft portion 51 floats with respect to the inner peripheral surface 83 due to the dynamic pressure of the fluid that works between both the faces 83 and 52, and the shaft portion 51 of the impeller 10 is rotatably supported in non-contact by the inner peripheral surface 83.

As described above, in the present embodiment, two locations of the inlet tube portion 21 and the shaft portion 51 of the impeller 10 are rotatably supported in a non-contact state in the radial direction Dr by the inner peripheral surfaces 68, 83, in other words, the impeller 10 is rotatably supported at both ends in a non-contact state in the radial direction Dr. Moreover, the impeller 10 is supported at two locations of the front side and the rear side on the basis of the position of the center of gravity thereof. Hence, according to the present embodiment, even if moment around an axis perpendicular to the rotation axis A is generated, the impeller 10 can be stably supported.

Additionally, in the present embodiment, the external diameter of the shaft portion 51 of the impeller 10 can be made small as mentioned above. Therefore, the circumferential speed of the shaft portion 51 can be suppressed. Hence, according to the present embodiment, a shearing strain that acts on a liquid that flows between the outer peripheral surface 52 of the shaft portion 51 and the inner peripheral surface 83 of the rear bearing forming portion 82 of the pump rear casing 81 can be made small. Thus, for example, in a case where jelly-like grains or the like are included in this liquid, damage to the jelly-like grains or the like can be suppressed.

In the present embodiment, the position of the impeller 10 in the axis direction Da with respect to the pump casing 60 is held by the magnetic coupling force between the driven magnets 19 within the impeller 10 and the driving magnets 219 of the drive unit 200. The position of the impeller 10 in the axis direction Da, which is held by magnetic coupling force, is a position where the impeller surface 10 and the face of the pump casing 60 that face each other in the axis direction Da do not come into contact with each other. That is, in the present embodiment, the impeller 10 is rotatably supported in a non-contact state also in the axis direction Da.

The impeller 10 is rotated with the driven magnet 19 by rotating the driving magnet 219, which is magnetically coupled with the driven magnet 19 embedded in the impeller 10, in the present embodiment as explained above. Therefore, it is possible that the magnetic flux from the driven and driving magnets is leaked outside and adversely affects the external electronics or the like. Also, the stable rotation of the impeller can be disturbed by imbalance of the magnetic coupling between the driving and driven magnets in the presence of a magnetic body outside.

Thus, the casing main body (the magnetism shielding body) 231, which is in a tubular shape with a bottom plate and made of a paramagnetic aluminum alloy, centered on the rotation axis A is provided in the present embodiment as shown in FIG. 6. Also, the cup (the magnet retaining ring) 220, which is in a tubular shape with a bottom plate and made of a ferromagnetic carbon steel such as SS400 or the like, is provided inside of the casing main body with a gap as a yoke. Also, multiple driving magnets 219 are fixed to the inner circumference side of the cup (the magnet retaining ring) 220. Also, multiple driven magnets 19 are provided to the inner circumference side (the rotation axis A side) of the driving magnets 219 with a gap.

Figure 7:
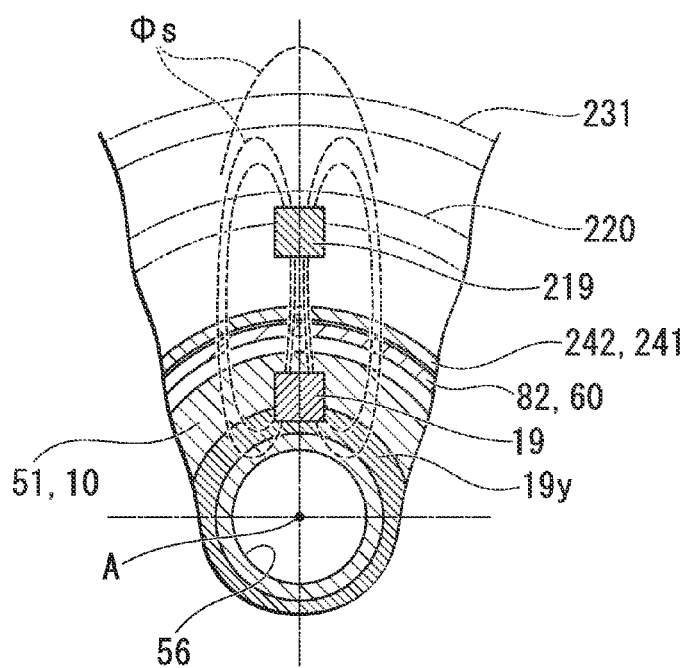
FIG. 7 is a schematic view schematically depicting the cross-section of the substantial part of the magnetic coupling pump unit of a comparative example.

If the casing main body (the magnetism shielding body) 231 and the cup (the magnet retaining ring) 220 were not provided in the present embodiment as shown in FIG. 7, a portion of magnetic flux Φs formed by the driven magnet 19 and the driving magnet 219 would run through the location of the extensive overhang.

However, the magnetic flux Φs directed to the outside and to the circumferential direction among the magnetic flux formed by the driven magnet 19 and the driving magnet 219 passes through the inside of the cup 220 making the cup (the magnet retaining ring) 220 formed of a ferromagnetic material be a part of the magnetic circuit, since the driving magnet 219 is fixed to the inside of the cup (the magnet retaining ring) 220 made of a ferromagnetic material in the present embodiment. Because of this, the amount of leakage of the magnetic flux formed by the driven magnet 19 and the driving magnet 219 to the outside can be reduced to an extremely low level in the present embodiment. Further, passing the magnetic flux through the casing main body 231 from the inside to the outside can be suppressed, since the casing main body (the magnetism shielding body) 231, which is made of a paramagnetic material, is provided to the outside of the cup 220 with the interspace (air gap).

Therefore, the leakage of the magnetic flux to the outside of the drive unit casing 230 can be suppressed to the minimum level in the present embodiment.

Also, passing through of the magnetic flux from the magnetic body to the inside of the casing body (the magnetism shielding body) 231 made of a paramagnetic material can be suppressed even in the presence of a magnetic body external to the drive unit casing 230 in the present embodiment. Furthermore, the leakage of the magnetic flux from the outside to the inside of the cup 220 in the present embodiment, since the cup (the magnet retaining ring) 220 made of a ferromagnetic material is provided to the inside of the casing main body (magnetism shielding body) 231.

Therefore, the effect to the magnetic flux formed by the driven magnet 19 and the driving magnet 219 can be suppressed to the minimum level in the present embodiment even in the presence of a magnetic body external to the drive unit casing 230.

As explained above, the first magnetic shielding measure, in which the leakage of the magnetic flux from a part is suppressed by actively allowing the magnetic flux to pass through the part (the cup 220 made of the ferromagnetic material), and the second magnetic shielding measure, in which the passage of the leaked the magnetic flux through the parts (the casing main body 231 made of paramagnetic material) is suppressed, are combined in the drive unit. Therefore, the leakage of the magnetic flux to the outside and the effect of the external magnetic field can be suppressed effectively. Specifically, the leakage of the magnetic flux from the part (the cup 220 made of ferromagnetic material) to the outside is suppressed by the first shielding measure, and then, the passing through the magnetic flux to the outside is further suppressed by the second shielding measure in the drive unit. Therefore, the leakage of the magnetic flux to the outside can be suppressed very effectively.

Further, in the present embodiment, the neodymium magnet is used as the driving magnet 219 as explained above. The neodymium magnet has an extremely strong magnetic force. However, the magnetic force can be varied dramatically in response to a temperature shift. For example, the Sm—Co (samarium-cobalt) magnet, which has a strong magnetic force next to the neodymium magnet, has a temperature coefficient of −0.03. The temperature coefficient represents the degree of the magnetic force variation relative to the temperature shift. Contrary to that, the neodymium magnet has a higher temperature coefficient of −0.09 to −0.12. Thus, the neodymium magnet has a higher magnetic force than the Sm-So magnet, but its magnetic force is reduced in a larger degree in response to temperature increase.

Therefore, the temperature increase of the driving magnet 219 is suppressed by rotating the driving magnet 219 made of the neodymium magnet with the cup 220 to cool the driving magnet 219, and by forming the heat-radiating fin 233 to the casing main body 231 covering the outer circumference of the driving magnet 219 to suppress the temperature increase in the casing main body 21 in the present embodiment.

The hydrodynamics pressure bearing pump is shown in the above-mentioned embodiments as an example of a pump. However, the present invention is not particularly limited to the configuration using the hydrodynamic pressure bearing. Any pump can be used in the present invention as long as it is a pump in which the impeller is rotated by using magnetic coupling.

The magnetic coupling pump 100 is detachable from the drive unit 200 in the above-mentioned embodiments. However, it is not essential for the magnetic coupling pump 100 to be detachable from the drive unit 200, and they can be formed integrally. In this case, the mount part may be omitted.

In the magnetic coupling pump unit, the magnetic flux leakage and the influence of the external magnetic field can be suppressed.

REFERENCE SIGNS LIST

1: MAGNETIC COUPLING PUMP UNIT
6: SUCTION PORT
7: DISCHARGE PORT
9: DISCHARGE HOSE CONNECTING PIPE PORTION
10: IMPELLER
11: BLADE
12: IMPELLER INLET
13: IMPELLER OUTLET
19: DRIVEN MAGNET
20: FRONT SHROUD
21: INLET TUBE PORTION
22: OUTER PERIPHERAL SURFACE (OF INLET TUBE PORTION)
31: FRONT PLATE PORTION
32: FRONT FACE
40: REAR SHROUD
41: REAR PLATE PORTION
42: REAR FACE
51: SHAFT PORTION
52: OUTER PERIPHERAL SURFACE (OF SHAFT PORTION)
53: REAR END FACE (OF SHAFT PORTION)
56: THROUGH HOLE
60: PUMP CASING
61: PUMP FRONT CASING
62: SUCTION HOSE CONNECTING PIPE PORTION
65: ENLARGED-DIAMETER PIPE PORTION
67: FRONT BEARING FORMING PORTION
68: INNER PERIPHERAL SURFACE (OF FRONT BEARING FORMING PORTION)
71: FRONT CASING BODY PORTION
72: FRONT FACE FACING PORTION
73: INNER SURFACE (OF FRONT FACE FACING PORTION)
75: FRONT BODY TUBE PORTION
81: PUMP REAR CASING
82: REAR BEARING FORMING PORTION
83: INNER PERIPHERAL SURFACE (OF REAR BEARING FORMING PORTION)
85: REAR WALL PLATE PORTION
91: REAR CASING BODY PORTION
92: REAR BODY TUBE PORTION
95: REAR FACE FACING PORTION
96: INNER SURFACE (OF REAR FACE FACING PORTION)
100: MAGNETIC COUPLING PUMP
200: DRIVE UNIT
210: MOTOR
211: OUTPUT SHAFT
219: DRIVING MAGNET
220: CUP (MAGNET RETAINING RING)
230: DRIVE UNIT CASING
231: CASING MAIN BODY (MAGNETISM SHIELDING BODY)
241: CAP (MOUNT PART)

The invention claimed is:

1. A drive unit of a magnetic coupling pump with an impeller, which is rotatable around a rotation axis, and a driven magnet, which is made of a permanent magnet and is fixed to the impeller, the drive unit comprising:
   a magnetism shielding body formed of a paramagnetic material and having a bottomed tubular shape;
   a mount part formed from resin, the mount part including an engaging portion formed at an outer peripheral edge thereof and engaging an opening edge of the magnetism shielding body, and blocking an opening of the magnetism shielding body, the mount part being capable of attaching to the magnetic coupling pump, the mount part having a bottomed cylindrical portion, the bottomed cylindrical portion having a drum section, the drum section being a fitting portion into which a pump casing of the magnetic coupling pump fits so that the magnetic coupling pump is capable of being detached from the mount part;
   a driving magnet formed of a neodymium magnet and positioned at an outside of the driven magnet of the magnetic coupling pump with respect to a rotation axis of the magnetic coupling pump attached to the mount part so as to face the driven magnet with a gap;
   a magnet retaining ring formed of a ferromagnetic material and including a tube portion having a tubular shape centered on the rotation axis of the magnetic coupling pump attached to the mount part, the magnet retaining ring being provided inside the magnetism shielding body with a gap, the driving magnet being fixed to an inside of the tube portion;
   a motor disposed inside the magnetism shielding body to rotate the magnet retaining ring around the rotation axis of the magnetic coupling pump attached to the mount part;
   a plurality of convex shaped cooling fins formed on an outer circumferential surface of the magnetism shielding body,
   wherein the cooling fins are formed so as to extend in a circumferential direction of the magnetism shielding body at predetermined intervals in an axial direction of the magnetism shielding body; and
   a channel formed on an outer circumferential surface of the engaging portion of the mount part, wherein a sealing member is accommodated in the channel.

2. The drive unit of a magnetic coupling pump according to claim 1, further comprising a drive unit casing housing the magnet retaining ring and the motor, wherein the drive unit casing comprises the mount part and the magnetism shielding body.

3. A magnetic coupling pump unit comprising:
   the drive unit of a magnetic coupling pump according to claim 2; and
   the magnetic coupling pump, wherein
   the pump casing of the magnetic coupling pump houses the impeller allowing the impeller to be rotated in the pump casing, and
   the driving magnet is provided to an outside of the pump casing centered on a rotation axis of the magnetic coupling pump attached to the mount part with a gap.

4. A magnetic coupling pump unit comprising:
   the drive unit of a magnetic coupling pump according to claim 1; and
   the magnetic coupling pump, wherein
   the pump casing of the magnetic coupling pump houses the impeller allowing the impeller to be rotated in the pump casing, the pump casing housing the impeller such that the impeller is allowed to float in the pump casing, the impeller defining a through hole that is aligned with a rotation axis of the magnetic coupling pump, the through hole communicating with a space in the pump casing, and
   the driving magnet is provided to an outside of the pump casing centered on the rotation axis of the magnetic coupling pump attached to the mount part with a gap.

5. The magnetic coupling pump unit according to claim 4, wherein
   the impeller comprises a tube portion, an outer circumferential surface of which is in a tubular shape centered on the rotation axis, and
   the pump casing comprises a hydrodynamic bearing forming portion, which houses the tube portion of the impeller and supports the tube portion rotatably without contacting the tube portion, an inner circumferential surface of the hydrodynamic bearing forming portion being in a tubular shape.

6. A magnetic coupling pump unit comprising:
   an impeller rotatable around a rotation axis;
   a pump casing housing the impeller so that the impeller is allowed to rotate relative to the pump casing, the impeller housed in the pump casing being allowed to float in the pump casing,
   the impeller defining a through hole that is aligned with the rotation axis, the through hole communicating with a space in the pump casing;
   a driven magnet made of a permanent magnet and fixed to the impeller;
   a magnetism shielding body made of a paramagnetic material and having a bottomed tubular shape;
   a driving magnet made of a neodymium magnet and positioned at an outside of the driven magnet with respect to the rotation axis with a gap;
   a magnet retaining ring made of a ferromagnetic material, the magnet retaining ring including a tube portion having a tubular shape centered on the rotation axis, wherein the magnet retaining ring is provided inside the magnetism shielding body with a gap, the driving magnet being fixed to an inside of the tube portion;
   a motor disposed inside the magnetism shielding body and being adapted to rotate the magnet retaining ring around the rotation axis; and
   a mount part formed from resin, the mount part including an engaging portion formed at an outer peripheral edge thereof and engaging an opening edge of the magnetism shielding body, and blocking an opening of the magnetism shielding body, the mount part being capable of being attached to the pump casing, the mount part having a bottomed cylindrical portion, the bottomed cylindrical portion having a drum section, the drum section being a fitting portion into which the pump casing fits so that the pump casing is capable of being detached from the mount part;
   a plurality of convex shaped cooling fins formed on an outer circumferential surface of the magnetism shielding body,
   wherein the cooling fins are formed so as to extend in a circumferential direction of the magnetism shielding body at predetermined intervals in an axial direction of the magnetism shielding body; and
   a channel formed on an outer circumferential surface of the engaging portion of the mount part, wherein a sealing member is accommodated in the channel.

7. The magnetic coupling pump unit according to claim 6, wherein
- the impeller comprises a tube portion, an outer circumferential surface of which is in a tubular shape centered on the rotation axis, and
- the pump casing comprises a hydrodynamic bearing forming portion, which houses the tube portion of the impeller and supports the tube portion rotatably without contacting the tube portion, an inner circumferential surface of the hydrodynamic bearing forming portion being in a tubular shape.

* * * * *